United States Patent Office 3,479,368
Patented Nov. 18, 1969

3,479,368
TRISUBSTITUTED METHYLBENZIMIDAZOLES
Eva Lea Samuel, Bentleigh, Victoria, and Brian Colwell Ennis, Mount Waverley, Victoria, Australia, assignors to Monsanto Chemicals (Australia) Limited, West Footscray, Victoria, a company of Victoria
No Drawing. Filed Sept. 18, 1967, Ser. No. 668,701
Claims priority, application Australia, Sept. 19, 1966, 11,197/66
Int. Cl. C07d *49/38;* A01n *9/22*
U.S. Cl. 260—309.2    4 Claims

ABSTRACT OF THE DISCLOSURE

Trisubstituted methylbenzimidazoles of the formula:

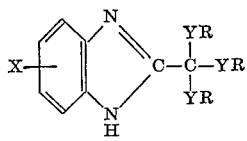

wherein X represents hydrogen or a nuclear substituent or substituents selected from chlorine, bromine, nitro, alkyl radical having from one to four carbon atoms, and alkoxy radical having from one to four carbon atoms; wherein Y is selected from sulfur and oxygen; wherein R is selected from alkyl radical having from one to twelve carbon atoms, hydroxyalkyl radical having from one to twelve carbon atoms, phenyl, benzyl, substituted phenyl wherein the substituent or are as specified for X, and substituted benzyl wherein the substituent or substituents is or are as specified for X, and wherein two of the YR groups may constitute a ring having from two to four carbon atoms; exhibit insecticidal activity, the compounds in which Y is sulfur also exhibiting rubber-vulcanization accelerator activity.

---

This invention provides novel compounds which are useful as biological toxicants, having a formula selected from the group consisting of (a)
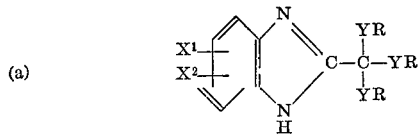

and (b)
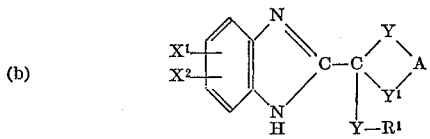

wherein $X^1$ and $X^2$ are independently selected from the group consisting of hydrogen, chlorine, bromine, nitro, alkyl of not more than four carbon atoms and alkoxy of not more than four carbon atoms; wherein Y and $Y^1$ are independently selected from the group consisting of oxygen and sulfur; wherein R is selected from the group consisting of alkyl of not more than twelve carbon atoms, hydroxyalkyl of not more than twelve carbon atoms,

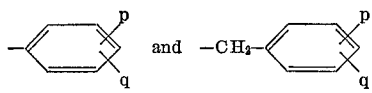

wherein $p$ and $q$ are each selected from the group consisting of hydrogen, chlorine, bromine, nitro, alkyl of not more than four carbon atoms and alkoxy of not more than four carbon atoms; wherein A is alkylene of at least two and not more than four carbon atoms; and wherein $R^1$ is selected from the group consisting of hydroxyalkyl of not more than four carbon atoms and mercaptoalkyl of not more than four carbon atoms.

Examples of specific compounds of the above formulae which are useful for the purpose of the invention are 2-trimethoxymethyl-benzimidazole; 2 - trimethoxymethyl-5 - chlorobenzimidazole; 2 - triethoxy-5,6-dichloro-benzimidazole; 2-triethoxymethyl - 5 - methyl-benzimidazole; 2 - trimethoxymethyl-5-bromo-6-nitro-benzimidazole; 2-triphenoxymethyl-benzimidazole; 2 - triphenoxymethyl-5,6 - dimethyl-benzimidazole; 2 - tris(p-chlorophenoxy)methyl - benzimidazole; 2 - tris(p - chlorophenoxy)methyl - 5 - chloro-benzimidazole; 2 - tris(p-nitrotolyl)methyl - 5 - methoxy-benzimidazole; 2-trimethylthiomethyl-benzimidazole; 2 - trimethylthiomethyl-5-chloro-benzimidazole; 2-trimethyl-thiomethyl - 5 - bromo-6 - nitro-benzimidazole; 2 - triethylthiomethyl - 5,6-dichloro-benzimidazole; 2-tri-n-butylthiomethyl-5-methyl-benzimidazole; 2 - tris(2′ - hydroxyethylthio)methyl-benzimidazole; 2 - tris(2′ - hydroxyethylthio)methyl-5-methyl-benzimidazole; 2 - triphenyl-thiomethyl-benzimidazole; 2 - tris(p-chlorophenylthio)methyl-5-chlorobenzimidazole; 2 - tris(p-nitrobenzylthio)methyl-5-methoxybenzimidazole; 2 - [2′ - (2″ - hydroxyethylthio)-1′,3′-oxathiolanyl]methyl-benzimidazole; and 2 - [2′ - (2″-hydroxyethylthio) - 1′,3′ - oxathiolanyl]methyl - 5,6-dimethyl-benzimidazole.

Compounds of the above Formula *a* can be prepared by reaction of a trichloromethyl benzimidazole with a hydroxy or mercapto compound, such as an alcohol, phenol, a mercaptan or thiophenol, preferably in the presence of a base, as illustrated by the following equation:

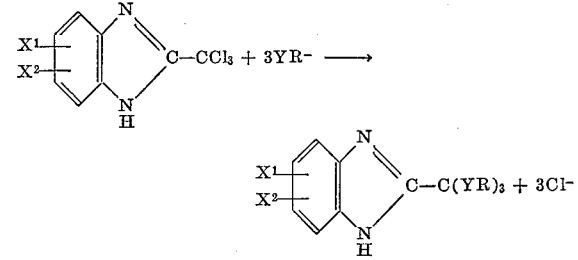

wherein $X^1$, $X^2$, Y and R are as defined above. In the case of compounds of the above Formula *b* the reactant is a compound having difunctional groups, such as glycol. In general, the trichloromethyl benzimidazole is added slowly to the hydroxy or thiol compound at a rate such as to avoid excessively high temperatures resulting from the exothermic reaction. The reaction mass is preferably cooled and stirred during the mixing of the reactants and until the reaction is substantially complete.

In practice it is usually convenient to dissolve or suspend the hydroxy or thiol compound in water and add a stoichiometric equivalent amount of a base, for example an inorganic base such as an alkali metal hydroxide or carbonate, particularly sodium hydroxide. Alternatively, the hydroxy or thiol compound can be dissolved or suspended in an alcohol such as ethanol or other lower alkanol, with an alkoxide, such as sodium or potassium alkoxide, or with an alkali metal such as sodium or potassium metal, in stoichiometric equivalent amount.

The reaction temperature should normally be kept low for optimum reaction conditions, since, at relatively high temperatures, the trialkoxy compounds may hydrolyze to form the esters, and the triarylthio compounds may react further to produce bisarylthio compounds. The reaction temperature will vary somewhat, depending on the nature of the nuclear substituents, however, in general, the present reaction can be conveniently conducted at temperatures in the range −10 to 80° C., but preferably in the range 15–30° C. The reaction is generally rapid, particularly in the presence of a base, 15–30 minutes usually being adequate for completion of the reaction, although this will depend on the particular reactants and operating temperature.

The desired tri-substituted methyl benzimidazole can usually be isolated from the reaction mixture simply by the addition of water to dissolve the inorganic chloride and precipitate the product, which is conveniently recovered by filtration. In cases where organic impurities are more soluble in alcohol than the desired product, it is more satisfactory first to filter the reaction mixture and then wash with water to remove the inorganic chlorides. The isolated product can be purified, if necessary, by conventional procedures.

Preparation of the compounds of the invention is illustrated by the following non-limitative examples.

EXAMPLE 1

2-trimethoxymethyl-benzimidazole is prepared as follows:

2-trichloromethyl-benzimidazole (2.4 g.) was dissolved in methanol (20 ml.) and allowed to react for several days. The solution was quenched into water (100 ml.), neutralized with sodium carbonate (10%), and the precipitated product was filtered off, to give white needles, M.P. 202° C., yield 53%.

Microanalysis gave the following.—Found: C, 59.4; H, 6.5; N, 12.6%; $C_{11}H_{14}N_2O_3$. Requires: C, 59.5; H, 6.4; N, 12.5%.

EXAMPLE 2

2-triphenoxymethyl-benzimidazole is prepared as follows:

2-trichloromethyl-benzimidazole (2.3 g.) was added slowly to a solution of phenol (2.8 g.) and sodium hydroxide (1.2 g.) in water (30 ml.). The mixture was stirred for 30 minutes and then filtered. The product was recrystallized from ethyl acetate to give colorless plates, M.P. 238° C., yield 88%.

Microanalysis gave the following.—Found: C, 76.3; H, 4.9; N, 7.0%; $C_{26}H_{20}N_2O_3$. Requires: C, 76.45; H, 4.9; N, 6.9%.

EXAMPLE 3

2-tris(p-chlorophenoxy)methyl-benzimidazole is prepared as follows:

Sodium ethoxide solution was prepared by adding sodium metal (0.4 g.) to ethanol (15 ml.). To this solution was added p-chlorophenol (1.8 g.) and 2-trichloromethyl benzimidazole (1.2 g.). The mixture was allowed to stand for 72 hours, and the precipitated product was then filtered off and recrystallized from benzene to give colorless needles, M.P. 265° C., yield 46%.

Microanalysis gave the following.—Found: C, 60.9; H, 3.6; N, 5.4%; $C_{26}H_{17}N_2O_3$. Requires: C, 60.9; H, 3.6; N, 5.5%.

EXAMPLE 4

2-trimethylthiomethyl-benzimidazole is prepared as follows:

Sodium ethoxide (10.2 g.) was dissolved in ethanol (120 ml.) and methyl mercaptan (7.2 g.) was added. To this mixture 2-trichloromethyl benzimidazole (11.7 g.) was added, and the mixture was stirred for 4 hours. The precipitated product was filtered off and washed with water and hot acetone. The product was recrystallized from ethyl acetate to give colorless crystals, M.P. 270° C., yield 54%.

Microanalysis gave the following.—Found: C, 49.4; H, 5.3; N, 10.6; S, 35.6%; $C_{11}H_{14}N_2S_3$. Requires: C, 49.0; H, 5.2; N, 10.4; S, 35.6%.

EXAMPLE 5

2-tris(2'-hydroxyethylthio)methyl-benzimidazole is prepared as follows:

Sodium metal (0.45 g.) was dissolved in ethanol (20 ml.). To this was added 2-mercaptoethanol (1.6 g.). 2-trichloromethyl benzimidazole (2.3 g.) was added over 30 minutes, keeping the temperature in the range 40–50° C. After 2 hours, the mixture was quenched into water, and filtered. The filtrate was neutralized by the addition of sodium carbonate solution (10%), and allowed to stand until the desired product had fully crystallized. The crude product was obtained in 31% yield, M.P. 150° C.

Microanalysis of the purified product gave the following.—Found: C, 46.4; H, 5.6; N, 7.6; S, 26.3%; $C_{14}H_{20}N_2O_3S_3$. Requires: C, 46.7; H, 5.6; N, 7.8; S, 26.6%.

EXAMPLE 6

2-tris(p-chlorophenylthio)methyl-benzimidazole is prepared as follows:

Using the process of Example 3, 2-trichloromethyl benzimidazole (2.3 g.) was reacted with p-chloromercaptobenzene (4.4 g.) to obtain colorless needles, M.P. 192–3° C., yield 82%.

Microanalysis gave the following.—Found: C, 56.1; H, 3.2; N, 5.0; S, 17.4%; $C_{26}H_{17}N_2S_3Cl_3$. Requires: C, 55.8; H, 3.0; N, 5.1; S, 17.2%.

EXAMPLE 7

2 - [2' - (2''-hydroxyethylthio) - 1',3' - oxathiolanyl]-benzimidazole is prepared as follows:

Sodium metal (4.6 g.) was dissolved in ethanol (150 ml.) and 2-mercaptoethanol (7.8 g.) was added. Keeping the temperature in the range −10 to −5° C., 2-trichloromethyl benzimidazole (11.8 g.) was added in small portions over 1 hour. The temperature was maintained within the indicated range for a further 2 hours, after which the reaction mixture was filtered. The filtrate was poured into water to precipitate the desired product, which was filtered off and recrystallized from ethyl acetate as colorless needles, M.P. 251–252° C., yield 74%.

Microanalysis gave the following.—Found: C, 51.4; H, 5.2; N, 10.4; S, 22.7%; $C_{12}H_{14}N_2S_2O_2$. Requires: C, 51.1; H, 5.0; N, 9.9; S, 22.7%.

The compounds of the invention are particularly useful for combatting insect pests, for example, 2 - trimethoxymethyl benzimidazole is useful against the housefly (*Musca domestica*), being highly active on contact at a dose of 10 µg. In combatting insect pests, utilizing compounds in accordance with the present invention, said compounds either per se or embodied in insecticidal compositions are applied to the insect pests or to their environment in a lethal or toxic amount. This can be done by distributing the compounds or insecticidal compositions containing them in or about an infested environment or in or about an environment which the insect pests frequent, e.g. agricultural soil or other growth media or other media attractive to the pests for habitational or sustenance or propagational purposes, in any conventional fashion which permits the insect pests to be subject to the toxic or lethal action of the active compound(s). Such distribution can be effected by applying liquid sprays or particulate solid compositions to a surface infested with the insect pests or attractive to the pests, as for example, the surface of an agricultural soil or other habitat media such as the above-ground surface of host plants by any conventional method, e.g., power dusters, boom and hand sprayers, spray dusters and the like. Sub-surface distribution can be carried out by mixing the active compound(s), with or without an appropriate carrier or extending agent, with the infested environment or with the environment the insect pests frequent. Thus, although the active compound(s) are useful per se in controlling and combatting insect pests, it is preferable in practicing the present invention to apply the active compound(s) to the pests or to their environment in a dispersed form in a suitable extending agent. The dispersion of the active compound(s) particles can be accomplished in various ways. Thus, the particles can be molecular in size and held in true solution in a suitable solvent or colloidal in size and distributed throughout a liquid phase in the form of suspensions or emulsions with or without surface-active agents of a nonionizing character. Also the particles can be distributed in a semi-solid viscous carrier such as petroleum or other ointment base of a non-ionizing character in which they may be actually dissolved in the semi-solid or held in suspension in the semi-solid with the aid of suitable non-ionizing surface-active agents. Alternatively, the particles may be mixed with and distributed throughout a solid carrier providing a mixture in particulate form, e.g., pellets, granules, powders, or dusts. In addition, the particles can be in mixtures which are suitable for use as aerosols including solutions, suspensions, or emulsions in carriers such as dichlorodifluoromethane and like haloalkanes or mixtures thereof and/or with other substances which boil below room temperature at atmospheric pressure. In this specification the expression "extending agent" includes any and all of those substances in which the active compound(s) are dispersed, including the solvents of a true solution, the liquid phase of suspensions, emulsions or aerosols, the semi-solid carrier of ointments, and the solid phase of particulate solids, e.g., pellets, granules, dusts and powders.

The concentration of the active compound(s) employed according to the present invention in controlling and combatting insect pests can vary considerably provided a toxic or lethal amount thereof is supplied to the pests or to the environment of the pests. When the extending agent is a liquid or mixture of liquids, as in solutions, suspensions, emulsions, or aerosols, the concentration of the active compound(s) employed to supply the required dosage is in the general range of about 0.001 to about 50 percent by weight of the total composition. When the extending agent is a semi-solid or solid, the concentration of the present pesticide employed to provide the requisite dosage is in the general range of about 0.01 to about 25 percent by weight of the formulation.

A large number of organic liquids can be used for the preparation of solutions, suspensions or emulsions of the active compound(s). Suitable organic liquids include, for example, isopropyl ether, acetone, methyl ethyl ketone, octanone, dioxane, cyclohexanone, carbon tetrachloride, ethylene dichloride, tetrachloroethane, hexane, heptane, and like higher liquid alkanes, hydrogenated naphthalenes, solvent naphtha, benzene, toluene, xylene, petroleum fractions such as kerosene and the like, boiling almost entirely under about 400° F., and having flash points above about 80° F., mineral oils having an unsulfonatable residue above about 80 percent and preferably above about 90 percent and the like. In those instances wherein there may be concern about the phytotoxicity of the organic liquid extending agent, at least a portion thereof can be replaced by low molecular weight aliphatic hydrocarbons such as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g., an aromatic hydrocarbon and an aliphatic ketone.

The active compounds(s) are preferably applied to the insect pests or to their environment in the form of emulsions or suspensions prepared by dispersing the derivatives or solutions thereof in water with the aid of a water-soluble non-ionic surfactant. The term "surfactant" as employed in this specification is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compound(s) in order to secure better wetting and spreading of the active ingredient in the water vehicle or carrier in which they are insoluble (see also Frear "Chemistry of Insecticides, Fungicides and Herbicides," second edition, page 280). The surfactants contemplated are the well-known capillary active substances which are non-ionizing (or non-ionic) and which are described in detail in volumes I and II of Schwartz, Perry and Berch's "Surface Active Agents and Detergents," (1958 Interscience Publishers, Inc., New York) and also in the November 1947 issue of Chemical Industries (pages 811–824) in an article entitled "Synthetic Detergents." The disclosures of these articles with respect to non-ionizing capillary active substances are incorporated in this specification by reference in order to avoid unnecessary enlargement of this specification. The preferred surfactants are the water-soluble non-ionic surface-active agents set forth in U.S. Patent No. 2,846,398 issued Aug. 5, 1958 to Beaver and Stoffel.

The present insecticides can be dispersed by suitable procedures (e.g., tumbling or grinding) in organic or inorganic solid extending agents and applied in particulate form to the insect pests or their environment. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur, powdered cork, powdered wood, powdered walnut shells and the like. While a large variety of solid carries are suitable, it is preferred to use adsorbent clays such as bentonite. These solid formulations can be used for insecticidal purposes in the dry form. Alternatively, by addition of a water-soluble non-ionic surfactant, the dry particulate solids can be rendered wettable by water and readily convertible to stable aqueous dispersions or suspensions suitable for use as sprays. For special purposes the active compound(s) can be dispersed in a semi-solid extending agent such as petrolatum with or without the aid of solubility promotors and/or non-ionic surfactants.

A concentrate, for example in the form of a spray base or particulate solid base is provided in such form that, by merely mixing with water or with a solid extender such as powdered clay, talc or other low-cost readily-available material, an easily prepared spray or particulate solid insecticide for household or agricultural purpose is produced. In such a concentrate composition, the active compound(s) are generally present in a concentration of 5 to 95 percent by weight, the residue being any one or more of the well-known insecticidal adjuvants, such as the surface-active clays, solvents, diluents, carrier media, adhesives, spreading agents, humectants, and the like. A particularly useful concentrate ready for mixing with or dispersing in other extending agents is an intimate mixture of the active compound(s) with a wetting or dispersing agent in proportions of about 0.1 to about 20 parts of surfactant with an amount of the derivative to provide 100 parts by weight. Such a concentrate is particularly well adapted to be made into a spray for combatting various forms of insect pests by the addition of water thereto. As illustrative of such a concentrate is an intimate mixture of about 80 parts by weight of the active compound(s) and about 20 parts by weight of a wetting or dispersing agent. Another useful concentrate adapted to be made into a spray for combatting insect pests is a solution of the active compound(s) in an organic solvent containing a minor amount of an emulsifying agent. As illustrative of such a concentrate is a solution of the active compound(s) in solvent naphtha, xylene or a petroleum fraction such as kerosene, containing an emulsifying agent.

In all of the various dispersions described hereinbefore for insecticidal purposes, the active ingredients can be advantageously employed in combination with other pesticides, including for example, other insecticides, nematocides, bactericides, and herbicides. In this manner it is possible to obtain mixtures which are effective against a wide varety of pests and other forms of noxious life.

The compounds of the present invention, more particularly the sulfur-containing compounds, i.e. those in which Y is sulfur, are also useful as rubber additives, more particularly as accelerators for the vulcanization of natural and/or synthetic rubbers. The invention accordingly comprises a process for the vulcanization of a sulfur-vulcanizable rubber wherein a compound of the invention as indicated above is incorporated in a natural and/or synthetic rubber mix, and the mixture heated to effect vulcanization. The invention also provides a composition comprising an unvulcanized sulfur-vulcanizable rubber and a compound of the invention as indicated above. Compositions of this kind may include other compounds which assist in the vulcanization of the rubber and/or in compounding the rubber for the purpose indicated. The amount of active compound according to the invention employed in the process of vulcanization can be as conventionally used, for example 0.5–5 parts by weight per 100 parts by weight of rubber.

The 2-trichloromethyl benzimidazoles used in the preparation of the compounds of the present invention can be prepared by the reaction of a mon-salt of an appropriately substituted o-phenylenediamine with an alkyl trichloroacetimidate, as illustrated in the following equation:

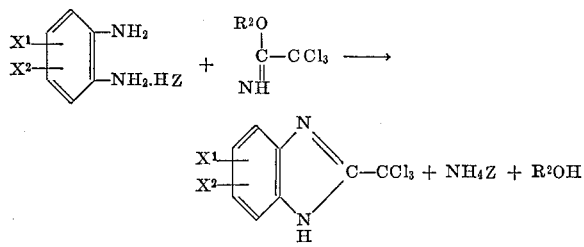

wherein $X^1$ and $X^2$ are as defined above, wherein Z denotes the radical of a mineral acid, preferably hydrochloric acid or sulfuric acid, and wherein $R^2$ denotes an alkyl group, preferably having fewer than five carbon atoms. The two components are mixed together, conveniently in a suitable solvent or diluent. Suitable solvents are ethers, such as dioxan, diethyl ether, 1,2-dimethoxyethane; esters, for example, ethyl acetate; and alcohols such as methanol or ethanol. The convenient procedure is to add the alkyl trichloroacetimidate gradually to a solution or suspension of the phenylenediamine salt. The preferred temperature of reaction and the duration of reaction varies appreciably with the nature of the nuclear substitutents denoted by $X^1$ and $X^2$. Electron-donating groups such as alkyl and alkoxy favor the reaction, which then occurs readily at room temperature, in some cases cooling being required as the reaction is exothermic. On the other hand, electron-attracting groups such as halogen retard the reaction and a temperature of 40–50° C. is required for the reaction to be complete within a satisfactory time. The reaction product is isolated and purified by conventional procedure.

Preparation of said 2-trichloromethyl benzimidazoles is illustrated in the folowing non-limitative practical examples:

EXAMPLE 8

Methyl trichloroacetimidate (0.1 mole) was added to a solution of o-phenylenediamine hydrochloride (0.1 mole) in dry methanol (150 ml.). An exothermic reaction occurred and a solid began to precipitate in half an hour. The reaction was completed in about 2 hours when the mixture was poured into water to give 2-trichloromethyl benzimidazole in 85% yield. This white crystalline solid was recrystallized from glacial acetic acid, dioxan, xylene or chloroform. The material had no melting point up to 360° C. and was identified by infrared (C–Cl peak at 820 cm.$^{-1}$ and ultraviolet spectra max. at 284 and 224 m$\mu$) with the following microanalytical figures:

Found: C, 40.5; H, 2.4; N, 12.2; Cl, 45.5%; $C_8H_5Cl_3N_2$. Requires: C, 40.8; H, 2.1; N, 11.8; Cl, 45.2%. The methyl trichloroacetimidate starting material can be prepared from trichloroacetontirile and methanol in the presence of anhydrous potassium carbonate by the method of Cramer, Ber., 1958, 91, 1049. The product so prepared was obtained in 90% yield and had B.P. 148° C., $n_D^{25}$—1.4785, $d_{25}$—1.45.

EXAMPLE 9

4-chloro-o-phenylenediamine monohydrochloride (0.02 mole) was reacted with methyl trichloroacetimidate (0.02 mole) by allowing them to stand overnight in dry methanol at room temperature. This mixture on quenching gave crude 2-trichloromethyl-5(6)-chlorobenzimidazole in 55% yield with 5% contaminate. The latter was removed by dissolving the mixture in acetic acid, filtration of the insoluble contaminate and aqueous quenching to give the desired compound. Several recrystallizations from xylene gave an analytically pure white crystalline material, M.P. 235° C. (I.R. spectrum aliphatic C–Cl 820 cm.$^{-1}$ aromatic C–Cl 810 cm.$^{-1}$).

Found: C, 36.1; H, 1.8; N, 10.4; Cl, 52.3%; $C_8H_4Cl_4N_2$. Requires: C, 35.7; H, 1.5; N, 10.4; Cl, 52.4%.

The 4-chloro-o-phenylenediamine monohydrochloride starting material can be prepared from the purified base by addition of hydrochloric acid in methanol and precipitation of the salt with petroleum ether.

EXAMPLE 10

Methyl trichloroacetimidate (0.01 mole) was added to a suspension of 4,5-dimethyl-o-phenylenediamine monohydrochloride (0.01 mole) in dimethoxyethane (80 ml.). No apparent reaction took place and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl-5,6-dimethylbenzimidazole in 35% yield. The crude material was recrystallized three times from benzene to give a white crystalline material having M.P. 190° C. After 4 hours drying at 80° C. under vacuum, analysis showed the material to contain ⅓ molecule of benzene of crystallization.

Found: C, 50.5; H, 3.8; N, 9.5; Cl, 36.9%;

Requires: C, 49.8; H, 3.8; N, 9.6; Cl, 36.8%.

After further two recrystallizations from benzene the material with M.P. 190° C. was dried for four hours at 100° C. under vacuum. Analysis showed that it now contained ⅙ molecule of benzene of crystallization.

Found: C, 47.6; H, 3.7; N, 10.1; Cl, 38.7%;

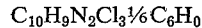

Requires: C, 47.7; H, 3.7; N, 10.1; Cl, 38.5%.

The 4,5-dimethyl-o-phenylenediamine monohydrochloride starting material can be prepared by the addition of hydrochloric acid to the base dissolved in ethyl acetate, followed by precipitation of the salt with petroleum ether. This starting material has a M.P. 225° C. and has only slight solubility in the usual solvents.

EXAMPLE 11

Methyl trichloroacetimidate (26.0 g., 0.15 mole) was added to a solution of 3,4-diaminotoluene hydrochloride (24.0 g., 0.15 mole) in 1,2-dimethoxyethane (400 ml.) at room temperature, and left overnight. Ammonium chloride was then filtered off and petroleum ether (B.P. 40–60° C.) was added to the filtrate to precipitate byproducts. These were filtered off and the solution was evaporated to give 5-methyl-2-trichloromethyl benzimidazole in 60% yield. After recrystallization from benzene, the solid had M.P. 187° C.

Found: C, 42.9; H, 2.9; N, 11.0%; $C_9H_7N_2Cl_3$. Requires: C, 43.2; H, 2.8; N, 11.2%.

The embodiments of the invention in which an exclusive property or privilege is claimed are defined as follows:

1. A trisubstituted methylbenzimidazole of the formula

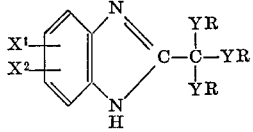

wherein $X^1$ and $X^2$ are independently selected from the group consisting of hydrogen, chlorine, bromine, nitro, alkyl of not more than four carbon atoms, and alkoxy of not more than four carbon atoms, wherein Y is selected from the group consisting of oxygen and sulfur, and wherein R is selected from the group consisting of alkyl of not more than twelve carbon atoms, hydroxyalkyl of not more than twelve carbon atoms,

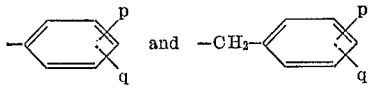

wherein $p$ and $q$ are independently selected from the group consisting of hydrogen, chlorine, bromine, nitro, alkyl of not more than four carbon atoms and alkoxy of not more than four carbon atoms.

2. A trisubstituted methylbenzimidazle in accordance with claim 1 wherein R is alkyl of not more than four carbon atoms.

3. A trisubstituted methylbenzimidazole in accordance with claim 1 which is 2-trimethoxymethyl benzimidazole.

4. A process for the preparation of a trisubstituted methylbenzimidazole of the formula

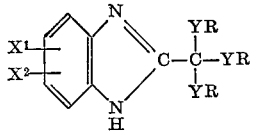

wherein $X^1$ and $X^2$ are independently selected from the group consisting of hydrogen, chlorine, bromine, nitro, alkyl of not more than four carbon atoms and alkoxy of not more than four carbon atoms, wherein Y is selected from the group consisting of oxygen and sulfur, and wherein R is selected from the group consisting of alkyl of not more than twelve carbon atoms, hydroxyalkyl of not more than twelve carbon atoms,

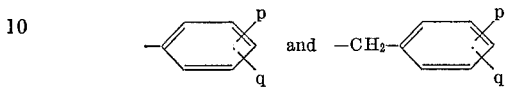

wherein $p$ and $q$ are independently selected from the group consisting of hydrogen, chlorine, bromine, nitro, alkyl of not more than four carbon atoms and alkoxy of not more than four carbon atoms; which comprises reacting a trichloromethyl benzimidazole of the formula

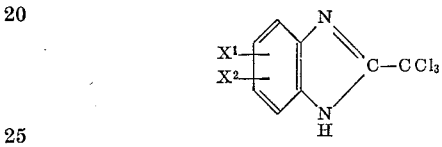

wherein $X^1$ and $X^2$ are as defined above with a compound of the formula

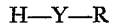

wherein R and Y are as defined above, at a temperature from about −10 to about 80° C.

References Cited

Ennis et al.: Jour. Chem. Soc. (London), Pt. C Organic 1967 pp. 30–33 (Number 1OF 1967). QD1. C6.

Vinot: Chem. Abst. Vol. 56, Column 11596 (1962), QD1. A51.

HENRY R. JILES, Primary Examiner

NATALIE TROUSOF, Assistant Examiner

U.S. Cl. X.R.

260—453; 424—273